(12) United States Patent
Viola et al.

(10) Patent No.: US 11,074,481 B2
(45) Date of Patent: *Jul. 27, 2021

(54) ENVIRONMENT NAVIGATION USING REINFORCEMENT LEARNING

(71) Applicant: DeepMind Technologies Limited, London (GB)

(72) Inventors: Fabio Viola, London (GB); Piotr Wojciech Mirowski, London (GB); Andrea Banino, London (GB); Razvan Pascanu, Letchworth Garden City (GB); Hubert Josef Soyer, London (GB); Andrew James Ballard, London (GB); Sudarshan Kumaran, London (GB); Raia Thais Hadsell, London (GB); Laurent Sifre, Paris (FR); Rostislav Goroshin, London (GB); Koray Kavukcuoglu, London (GB); Misha Man Ray Denil, London (GB)

(73) Assignee: DeepMind Technologies Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/745,757

(22) Filed: Jan. 17, 2020

(65) Prior Publication Data

US 2020/0151515 A1 May 14, 2020

Related U.S. Application Data

(63) Continuation of application No. 16/403,343, filed on May 3, 2019, now Pat. No. 10,572,776, which is a
(Continued)

(51) Int. Cl.
*G06K 9/00* (2006.01)
*G06K 9/62* (2006.01)
(Continued)

(52) U.S. Cl.
CPC ....... *G06K 9/6262* (2013.01); *G06K 9/00624* (2013.01); *G06N 3/006* (2013.01);
(Continued)

(58) Field of Classification Search
CPC .. G06K 9/6262; G06K 9/00624; G06N 3/006; G06N 3/04; G06N 3/0445;
(Continued)

(56) References Cited

U.S. PATENT DOCUMENTS

2018/0268237 A1* 9/2018 Stanimirovic ....... G06K 9/2018

OTHER PUBLICATIONS

Guilaume Lample et al: playining FPS Games with Deep Reinforcement Learning:, arxiv.org, Cornell University Liberry, 201 Olin Library Cornell University Ithaca, NY 14853, Sep. 18, 2016 (Sep. 18, 2016), XP080727453 (Year: 2016).*
(Continued)

*Primary Examiner* — Ping Y Hsieh
(74) *Attorney, Agent, or Firm* — Fish & Richardson P.C.

(57) ABSTRACT

Methods, systems, and apparatus, including computer programs encoded on a computer storage medium, for training a reinforcement learning system. In one aspect, a method of training an action selection policy neural network for use in selecting actions to be performed by an agent navigating through an environment to accomplish one or more goals comprises: receiving an observation image characterizing a current state of the environment; processing, using the action selection policy neural network, an input comprising the observation image to generate an action selection output; processing, using a geometry-prediction neural network, an intermediate output generated by the action selection policy neural network to predict a value of a feature of a geometry of the environment when in the current state; and backpropagating a gradient of a geometry-based auxiliary loss into the action selection policy neural network to determine
(Continued)

a geometry-based auxiliary update for current values of the network parameters.

20 Claims, 3 Drawing Sheets

Related U.S. Application Data continuation of application No. PCT/IB2017/056907, filed on Nov. 4, 2017.

(60) Provisional application No. 62/418,074, filed on Nov. 4, 2016.

(51) Int. Cl.
| | |
|---|---|
| *G06N 3/04* | (2006.01) |
| *G06N 3/08* | (2006.01) |
| *G06N 3/00* | (2006.01) |
| *G06T 7/50* | (2017.01) |
| *G06T 7/70* | (2017.01) |

(52) U.S. Cl.
CPC ............. *G06N 3/04* (2013.01); *G06N 3/0445* (2013.01); *G06N 3/0454* (2013.01); *G06N 3/084* (2013.01); *G06T 7/50* (2017.01); *G06T 7/70* (2017.01); *G06T 2207/20076* (2013.01); *G06T 2207/20081* (2013.01); *G06T 2207/20084* (2013.01); *G06T 2207/30248* (2013.01)

(58) Field of Classification Search
CPC ........ G06N 3/0454; G06N 3/084; G06T 7/50; G06T 7/70; G06T 2207/20076; G06T 2207/20081; G06T 2207/20084; G06T 2207/30248
See application file for complete search history.

(56) References Cited

OTHER PUBLICATIONS

Cesar Cadena et al: "past, Present, and Future of Simulaneous Localization and Mapping: Toward the Robust-Perception Age". CORR (ARXIV), vol. 1606.05830v2, Jul. 20, 2016 (Jul. 20, 2016), pp. 1-27, XP055448575 (Year: 2016).*
KR Office Action in Korean Appln. No. 10-2019-7015991, dated Jun. 22, 2020, 13 pages (with English translation).
Barron et al, "Deep Reinforcement Learning in a 3-D Blockworld Environment," Deep Reinforcement Learning: Frontiers and Challenges, IJCAI 2016, 6 pages.
Cadena et al, "Past, Present, and Future of Simultaneous Localization and Mapping: Toward the Robust-Perception Age," IEEE Transactions on robotics , 2016, pp. 1309-1332.
Dissanayake et al, "A solution to the simultaneous localization and map building (slam) problem," EEE Transactions on Robotics and Automation, 2001, pp. 17(3):229-241.
Eigen et al, "Depth map prediction from a single image using a multi-scale deep network," Proc. of Neural Information Processing Systems, 2014, 9 pages.
Graves et al, "Hybrid computing using a neural network with dynamic external memory," Nature, 2016, 21 pages.
Graves et al, "Speech recognition with deep recurrent neural networks," Proceedings of the International Conference on Acoustics, 2013, 5 pages.
Hausknecht & Stone, "Deep recurrent q-learning for partially observable mdps," Proc. of Conf. on Artificial Intelligence, 2015, pp. 29-37.
Ho et al, "Loop closure detection in SLAM by combining visual and spatial appearance" Robotics and Autonomous Systems , 2006, pp. 740-749.
Jaderberg et al, "Reinforcement learning with unsupervised auxiliary tasks," Submitted to Int'l Conference on Learning Representations, 2017, 14 pages.
Koutník et al, "Evolving large-scale neural networks for vision-based reinforcement learning," Proceedings of the 15th annual conference on Genetic and evolutionary computation, 2013, 8 pages.
Kulkarni et al, "Deep successor reinforcement learning," CoRR, abs/1606.02396, 2016, 10 pages.
Lample & Chaplot, "Playing FPS games with deep reinforcement learning," CoRR, 2016, pp. 2140-2146.
Maaten & Hinton, Visualizing data using t-sne. Journal of Machine Learning Research, 2008, pp. 9(Nov):2579-2605.
Mirowski et al, "Dynamic auto-encoders for semantic indexing," NIPS Deep Learning and Unsupervised Learning Workshop, 2010, 9 pages.
Mnih et al, "Human-level control through deep reinforcement learning," Nature, 2015, pp. 518:529-533.
Mnih et. al., "Asynchronous methods for deep reinforcement learning," Proceedings of the 33rd International Conference on Machine Learning, 2016, 10 pages.
Nair et al, "Massively parallel methods for deep reinforcement learning," Proceedings of the International Conference on Machine Learning Deep Learning Workshop, 2015, 14 pages.
Narasimhan et al, "Language understanding for text-based games using deep reinforcement learning," Proc. of Empirical Methods in Natural Language Processing, EMNLP, 2015, 11 pages.
Oh et al, "Control of memory, active perception, and action in minecraft," Proc. of International Conference on Machine Learning, ICML, 2016, 22 pages.
Olton et al, "Hippocampus, space, and memory," Behavioral and Brain Sciences, 1979, pp. 313-322.
Pascanu et al, "How to construct deep recurrent neural networks," arXiv preprint arXiv:1312.6026, 2013, 13 pages.
PCT International Preliminary Report on Patentability in International Appln. PCT/IB2017/056907, dated May 16, 2019, 10 pages.
PCT International Search Report and Written Opinion in International Appln. No. PCT/IB2017/056907, dated Feb. 16, 2018, 16 pages.
Rasmus et al, "Semi-supervised learning with ladder networks," Advances in Neural Information Processing Systems, NIPS, 2015.
Suddarth & Kergosien, "Rule-injection hints as a means of improving network performance and learning time," Neural Networks, 1990, pp. 120-129.
Sutton et al, "Between mdps and semi-mdps: A framework for temporal abstraction in reinforcement learning," Artificial intelligence, 1999, 112(1):181-211.
Tessler et al, "A deep hierarchical approach to lifelong learning in minecraft," CoRR, abs/1604.07255, 2016.
Weston et al, "Memory networks," arXiv preprint arXiv:1410.3916, 2014, 15 pages.
Zhang et al, "Augmenting supervised neural networks with unsupervised objectives for large-scale image classification," Proc. of International Conference on Machine Learning, ICML, 2016, 10 pages.
Zhao et al, "Stacked what-where auto-encoders," Int'l Conf. on Learning Representations (Workshop), ICLR, 2015.
Zhu et al, "Target-driven visual navigation in indoor scenes using deep reinforcement learning," CoRR, abs/1609.05143, 2016.
KR Office Action in Korean Appln. No. 10-2019-7015991, dated Jan. 6, 2021, 5 pages (with English translation).
EP Office Action in European Appln. No. 17812054.9, dated Apr. 15, 2021, 9 pages.

\* cited by examiner

FIG. 3

ENVIRONMENT NAVIGATION USING REINFORCEMENT LEARNING

CROSS-REFERENCE TO RELATED APPLICATIONS

This application is a continuation application of, and claims priority to, patent application Ser. No. 16/403,343, filed on May 3, 2019, which is a continuation application of, and claims priority to, PCT Patent Application No. PCT/IB2017/056907, filed on Nov. 4, 2017, which application claims the benefit under 35 U.S.C. § 119(e) of U.S. Patent Application No. 62/418,074, filed Nov. 4, 2016. The disclosure of each of the foregoing applications is incorporated herein by reference.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a reinforcement learning system implemented as computer programs on one or more computers in one or more locations that selects actions to be performed by an agent interacting with an environment. Generally, the system uses an action selection policy neural network in selecting actions to be performed in response to observations of the environment. To improve training of the action selection policy neural network, during this training, a training engine also trains (i) a geometry prediction neural network, (ii) a loop closure prediction neural network, or both, that receive as inputs respective intermediate outputs of the action selection policy neural network.

There is provided a method of training an action selection policy neural network having a plurality of network parameters for use in selecting actions to be performed by an agent navigating through an environment to accomplish one or more goals. The method comprises: receiving an observation image characterizing a current state of the environment; processing, using the action selection policy neural network and in accordance with current values of the network parameters, an input comprising the observation image to generate an action selection output; processing, using a geometry-prediction neural network, an intermediate output generated by the action selection policy neural network to predict a value of a feature of a geometry of the environment when in the current state; and determining a gradient of a geometry-based auxiliary loss that is based on an actual value of the feature and the predicted value of the feature; and backpropagating the gradient of the geometry-based auxiliary loss into the action selection policy neural network to determine a geometry-based auxiliary update for the current values of the network parameters.

In some implementations, the predicted value of the feature of the geometry is a predicted depth of the environment as characterized by the observation image and the actual value of the feature of the geometry is an actual depth of the environment as characterized by the observation image. In some implementations the auxiliary loss is used for training the system but the predicted value of the feature of the geometry need not be otherwise used.

In some implementations, the action selection policy neural network comprises: a convolutional encoder neural network that generates an encoded representation of the input, an intermediate neural network that processes the encoded representation of the input to generate an intermediate representation; and an output neural network that processes the intermediate representation to generate the action selection output.

In some implementations, the intermediate output comprises the encoded representation.

In some implementations, the intermediate output comprises the intermediate representation.

In some implementations, the method further comprises: processing the intermediate representation using a loop closure prediction neural network that is configured to generate a score that represents a predicted likelihood that, when the environment is in the current state, the agent has returned to a location in the environment that the agent has already visited; determining a gradient of a loop closure auxiliary loss that is based on an actual similarity of the current state to earlier states of the environment and the predicted likelihood; and backpropagating the gradient of the loop closure auxiliary loss into the action selection policy neural network to determine a loop closure auxiliary update for the current values of the network parameters.

In some implementations, the intermediate neural network is a recurrent neural network.

In some implementations, the intermediate neural network is a feedforward neural network.

In some implementations, the method further comprises: selecting an action to be performed by the agent when the environment is in the current state using the action selection output; receiving a reward that is based on progress toward accomplishing the one or more goals; and determining a main update for the network parameters based at least in part on the reward.

In some implementations, the method further comprises: using the geometry-based auxiliary update and the main update to update the current values of the network parameters.

In some implementations, the method further comprises: updating the current values of the network parameters using the geometry-based auxiliary update to generate updated parameter values; and using the action selection policy neural network to select an action to be performed by the agent in accordance with the updated parameter values.

Particular embodiments of the subject matter described in this specification can be implemented so as to realize one or more of the following advantages. By training a geometry prediction neural network or a loop closure prediction neural network or both to perform auxiliary prediction tasks, in addition to training the action selection policy neural network to maximize cumulative reward, the reinforcement learning system described in this specification can augment the feedback signals received during the training of the action selection policy neural network to improve training. In particular, training the geometry prediction neural network or loop closure prediction neural network tunes the values of the action selection policy neural network parameters, causing them to generate more useful representations of observed data and ultimately determine more effective policy outputs to maximize cumulative reward, even when rewards received by the reinforcement learning system are sparse, e.g., are only rarely non-zero. For example, training the geometry prediction neural network tunes the values of the action selection policy neural network parameters to encourage the learning of representations that aid in obstacle avoidance and short-term trajectory planning. As another example, training the loop closure prediction neural network tunes the values of the action selection policy neural network parameters to encourage efficient exploration of an environment and spatial reasoning.

The reinforcement learning system described in this specification trains the action selection policy neural network faster than conventional reinforcement learning systems that do not include geometry prediction neural networks and loop closure prediction neural networks. Therefore, the reinforcement learning system described in this specification allows more efficient use of computational resources in training. Moreover, the reinforcement learning system described in this specification achieves superior performance to conventional reinforcement learning systems, i.e., allows an agent to more effectively navigate through an environment.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
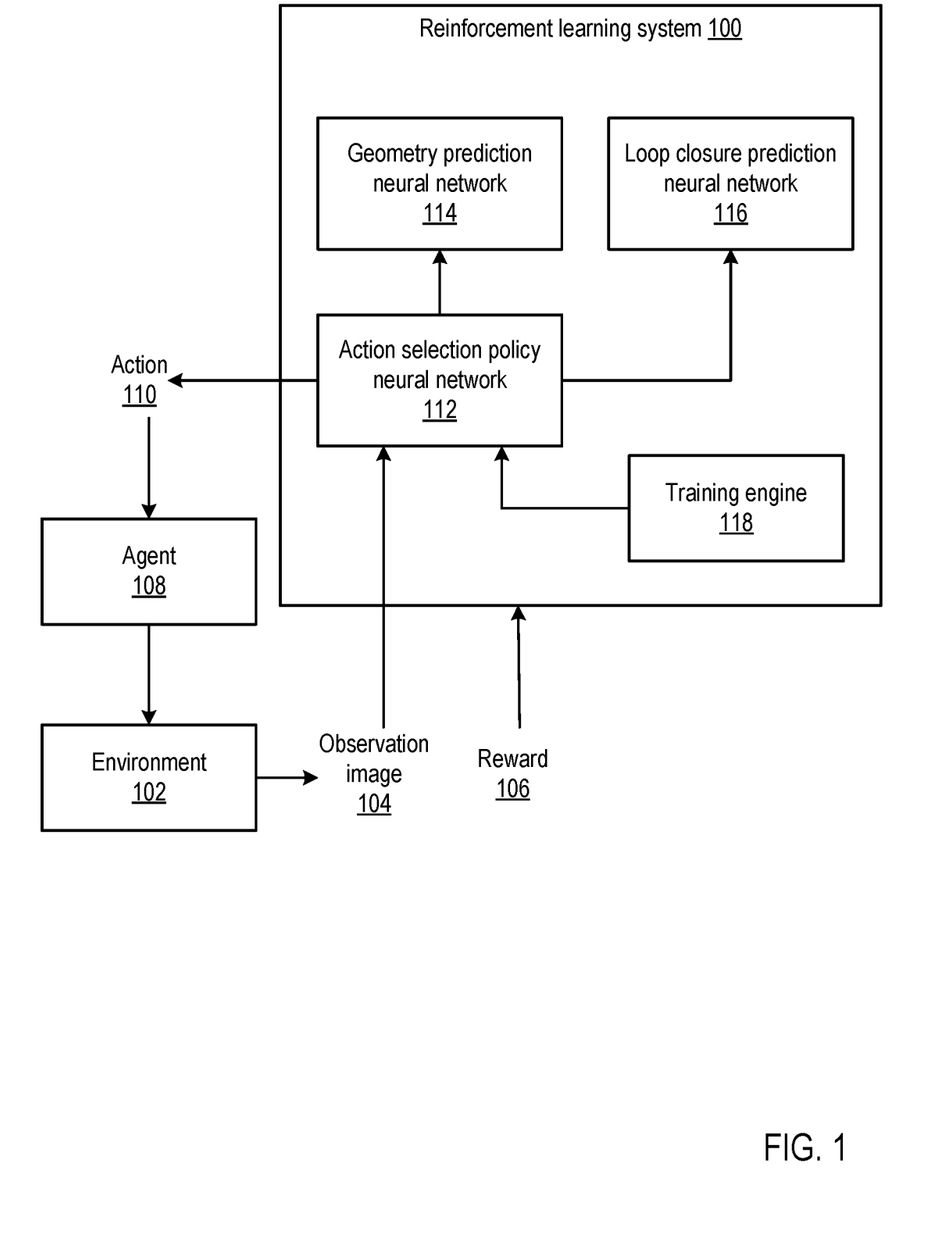
FIG. 1 shows an example reinforcement learning system.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 selects actions 110 to be performed by an agent 108 interacting with an environment 102 at each of multiple time steps. In order for the agent 108 to interact with the environment 102, the system 100 receives an observation image 104 characterizing the current state of the environment 102 and selects an action 110 to be performed by the agent 108 in response to the received observation image 104.

In some implementations, the environment 102 is a simulated environment and the agent 108 is implemented as one or more computer programs interacting with the simulated environment by navigating through the simulated environment. For example, the simulated environment may be a video game and the agent 108 may be a simulated user playing the video game by navigating through the simulated environment. As another example, the simulated environment may be a motion simulation environment, e.g., a driving simulation or a flight simulation, and the agent 108 is a simulated vehicle navigating through the motion simulation environment. In these cases, the actions 110 may be control inputs to control the simulated user or simulated vehicle.

In some other implementations, the environment 102 is a real-world environment and the agent 108 is a mechanical agent interacting with the real-world environment. For example, the agent 108 may be an autonomous or semi-autonomous vehicle navigating through the environment. In these cases, the actions 110 may be control inputs to control the robot or the autonomous vehicle.

In some of these implementations, the observation images 104 may be generated by or derived from sensors of the agent 108. For example, the observation images 104 may be RGB images captured by a camera of the agent 108. As another example, the observation images 104 may be derived from data captured from a laser sensor of the agent 108. As another example, the observation images may be hyperspectral images captured by a hyperspectral sensor of the agent 108.

At each time step, the system 100 receives a reward 106 based on the current state of the environment 102 and the action 110 of the agent 108 at the time step. For example, the system 100 may receive a reward 106 for a given time step based on progress toward the agent 108 accomplishing one or more goals. For example, a goal of the agent may be to navigate to a goal location in the environment 102.

The system 100 uses an action selection policy neural network 112 in selecting actions to be performed by the agent 108 in response to observation images 104 at each time step. In particular, the action selection policy neural network 112 is configured to receive an input including an observation image 104 and to process the input in accordance with a set of parameters of the action selection policy neural network to generate a policy output that the system 100 uses to determine an action 110 to be performed by the agent 108 at the time step. In some implementations, the action selection policy neural network 112 is configured to receive additional inputs, including one or more of: agent-relative lateral, rotational velocity, the action performed by the agent at the previous time step, i.e. the time step before the current time step, or the reward received by the system at the previous time step. The agent-relative lateral velocity refers to the forward and sideways velocity of the agent as defined in the egocentric reference frame of the agent. The angular velocity refers to the rotational velocity of the agent about the vertical axis.

In some implementations, the policy output is a probability distribution over the set of possible actions. In some implementations, the policy output may be a Q-value that is an estimate of the long-term time-discounted reward that would be received if the agent 108 performs a particular action in response to the observation. In some implementations, the policy output may identify a particular action that is predicted to yield the highest long-term time-discounted reward if performed by the agent in response to the observation. In some implementations, the policy output is a combination of the previously described policy outputs.

In general, the action selection policy neural network 112 includes a convolutional encoder neural network that generates an encoded representation of the input observation image 104, an intermediate neural network that processes the encoded representation of the input observation image to generate an intermediate representation, and an output neural network that processes the intermediate representation to generate the policy output. In some implementations, the intermediate neural network is a feedforward neural network. For example, the intermediate neural network may be a multi-layer perceptron (MLP). In some other implementations, the intermediate neural network is a recurrent neural network. In these implementations, the intermediate neural network may be a long short-term memory (LSTM) network, or a stack of LSTM networks. A stack of LSTM networks is an ordered set of multiple LSTM networks, where the first LSTM network processes the encoded representation, and each subsequent LSTM network processes the output of the previous LSTM network. In some implementations, the stack of LSTM networks may include skip-connections providing the encoded representation to LSTM networks after the first LSTM network. In some implementations, the output neural network is a feedforward neural network. For example, the output neural network may be a MLP.

In implementations where the action selection policy neural network 112 is configured to receive inputs additional to the observation image 104, including agent-relative lateral and rotational velocity, the action performed by the agent at the previous time step, and the reward received by the system 100 at the previous time step, the additional inputs may be provided as input to the encoder neural network or the intermediate neural network of the action selection policy neural network 112. Where the additional inputs are provided as input to the intermediate neural network, the encoded representation of the input observation image and the reward may be provided to a first layer of the intermediate neural network and the additional inputs may be provided to a second layer of the intermediate neural network which also has an input from an output of the first layer. In this way the first layer may make associations between a visual observation and a reward, which are provided to the second layer from which the policy is computed.

In general, a training engine 118 trains the action selection policy neural network 112 to generate policy outputs that maximize the expected cumulative reward received by the system 100, e.g. a long-term time-discounted sum of rewards received by the system 100, by using a reinforcement learning technique to iteratively adjust the values of the set of parameters of the action selection policy neural network. An example of a reinforcement learning technique is described in Volodymyr Mnih et. al., "Asynchronous methods for deep reinforcement learning," Proceedings of the 33$^{rd}$ International Conference on Machine Learning, 2016.

In addition to training the action selection policy neural network 112 to maximize the expected cumulative reward, the training engine 118 may train the action selection policy neural network 112 by additionally training a geometry prediction neural network 114 that receives as input an intermediate output of the action selection policy neural network 112. Training the geometry prediction neural network 114 tunes the values of the set of parameters of the action selection policy neural network 112 to cause the action selecting policy neural network 112 to generate more useful representations of observations 104 which aid in obstacle avoidance and short-term trajectory planning and cause the action selection policy neural network 112 to determine more effective policy outputs to maximize expected cumulative reward, even when non-zero rewards are only rarely received.

The geometry prediction neural network 114 receives as input an intermediate output of the action selection policy neural network 112 when processing a given observation image, and processes the input in accordance with the values of a set of parameters of the geometry prediction neural network, to generate as output a predicted value of a feature of a geometry of the environment in the current state. In some implementations, the feature of the geometry of the environment in the current state is the depth of the environment as characterized by the given observation image, i.e. depth values corresponding to pixels of the given observation image, where the depth value for a pixel corresponds to the distance from the agent sensor that captured the given observation image to a surface or object depicted in the given observation image that contains the pixel. In some implementations, the feature of the geometry of the environment in the current state is the distance of the agent 108 from known landmarks in the environment. In some implementations, the feature of the geometry of the environment in the current state is the bearing of the agent 108 relative to known landmarks in the environment. In some implementations, the feature of the geometry of the environment in the current state is the observation image of the environment in the current state, a predicted future observation image of the environment, or a reconstruction of a past observation image of the environment that was previously received. In some implementations, the feature of the geometry of the environment is some combination of the previously described features of the geometry of the environment. In some implementations, the geometry prediction neural network 114 is a feed-forward neural network. For example, the geometry prediction neural network may be a MLP.

An intermediate output of the action selection policy neural network 112 is a set of activations generated at one or more units of one or more hidden layers of the action selection policy neural network 112 in response to processing the given observation as input. In some implementations, the intermediate output of the action selection policy neural network 112 provided as input to the geometry prediction neural network 114 is the encoded representation generated by the convolutional encoder neural network of the action selection policy neural network 112. In some other implementations, the intermediate output of the action selection policy neural network 112 provided as input to the geometry prediction neural network 114 is the intermediate representation generated by the intermediate neural network of the action selection policy neural network 112. In some other implementations, the system 100 includes two geometry prediction neural networks, where one geometry prediction neural network receives the encoded representation generated by the convolutional encoder neural network of the action selection policy neural network 112 as input, and where the other geometry prediction neural network receives the intermediate representation generated by the intermediate neural network of the action selection policy neural network 112 as input.

The training engine 118 trains the geometry prediction neural network 114 to generate a predicted value of the feature of the geometry that minimizes a geometry-based auxiliary loss that is based on the actual value of the feature of the geometry. Specifically, the training engine 118 back-propagates the gradient of the geometry-based auxiliary loss to adjust the values of the set of parameters of the geometry prediction neural network 114, and to adjust the values of some of the set of parameters of the action selection policy neural network 112, in order to minimize the geometry-based auxiliary loss. In particular, the training engine 118 adjusts the parameters of the action selection policy neural network corresponding to (i) the one or more units of the one or more hidden layers of the intermediate output of the action selection policy neural network 112 that the system 100 provides as input to the geometry prediction neural network, and (ii) units that feed-forward into the one or more units of the one or more hidden layers of the intermediate output of the action selection policy neural network 112 that the system 100 provides as input to the geometry prediction neural network. In this specification, a first unit is said to feed-forward into a second unit if the output of the first unit is either directly or indirectly provided as an input to the second unit. An example process for training the action selection policy neural network 112 by training the geometry prediction neural network 114 is described with reference to FIG. 2.

In addition to training the action selection policy neural network 112 to maximize the expected cumulative reward, the training engine 118 may train the action selection policy neural network 112 by additionally training a loop closure prediction neural network 114 that receives as input an intermediate output of the action selection policy neural network 112. Training the loop closure prediction neural network 114 tunes the values of the set of parameters of the action selection policy neural network 112 to cause the action selecting policy neural network 112 to generate more useful representations of observations 104 which aid in efficient environment exploration and spatial reasoning, and cause the action selection policy neural network 112 to determine more effective policy outputs to maximize expected cumulative reward, even when rewards are sparse, i.e., non-zero rewards are only rarely received.

The loop closure prediction neural network 116 receives as input an intermediate output of the action selection policy neural network 112 when processing a given observation image, and processes the input in accordance with the values of a set of parameters of the loop closure prediction neural network 116 to generate as output a score that represents a predicted likelihood that, when the environment is in the current state, the agent has returned to a location in the environment that the agent has already visited. In some implementations, the agent is considered to have returned to a location in the environment that the agent has already visited only if the agent previously visited the location within a fixed previous number of time steps. In some implementations, the loop closure prediction neural network 116 is a feed-forward neural network. For example, the loop closure prediction neural network 116 may be a MLP.

In some implementations, the intermediate output of the action selection policy neural network 112 provided as input to the loop closure prediction neural network 114 is the encoded representation generated by the convolutional encoder neural network of the action selection policy neural network 112. In some other implementations, the intermediate output of the action selection policy neural network 112 provided as input to the loop closure prediction neural network 114 is the intermediate representation generated by the intermediate neural network of the action selection policy neural network 112.

The training engine 118 trains the loop closure prediction neural network 116 to generate a score that minimizes a loop closure auxiliary loss that is based on an actual similarity of a location of the current state to the locations of earlier states of the environment, and the predicted likelihood that, when the environment is in the current state, the agent has returned to a location in the environment that the agent has already visited. Specifically, the training engine 118 backpropagates the gradient of the loop closure auxiliary loss to adjust the values of the set of parameters of the loop closure prediction neural network 116, and to adjust the values of some of the set of parameters of the action selection policy neural network 112, in order to minimize the loop closure auxiliary loss. In particular, the training engine 118 adjusts the parameters of the action selection policy neural network corresponding to (i) the one or more units of the one or more hidden layers of the intermediate output of the action selection policy neural network 112 that the system 100 provides as input to the loop closure prediction neural network 116, and (ii) units that feed-forward into the one or more units of the one or more hidden layers of the intermediate output of the action selection policy neural network 112 that the system 100 provides as input to the loop closure prediction neural network 116. An example process for training the action selection policy neural network 112 by training the loop closure prediction neural network 116 is described with reference to FIG. 3.

In some implementations, the training engine 118 trains the action selection policy neural network, the geometry prediction neural network, and the loop closure prediction neural network online, i.e. based on observations and rewards as they are received. For example, at a given time step, the system 100 may select an action to be performed by the agent 108 based on the policy output generated by the action selection policy neural network 112, receive a reward 106, and the training engine 118 may update the values of the parameters of the neural networks of the system 100 through gradient backpropagation based on one or more of the reinforcement learning technique, the auxiliary geometry-based loss, and the loop closure auxiliary loss. In this example, at the next time step, the system 100 selects the action to be performed by the agent 108 based on the policy output generated by the action selection policy neural network 112 in accordance with the updated values of the parameters of the action selection policy neural network 112. In some implementations, the training engine 118 trains the networks from experiences (i.e., tuples including observations, actions, rewards for previous time steps) stored in a replay memory. The training engine 118 may train the networks using on-policy training or off policy training, or any other appropriate reinforcement learning technique. Moreover, gradient backpropagation based on the reinforcement learning technique, the auxiliary geometry-based loss, and the loop closure auxiliary loss are associated with different weight values that scale the size of the adjustment to the parameters of the networks based on the gradients.

Figure 2:
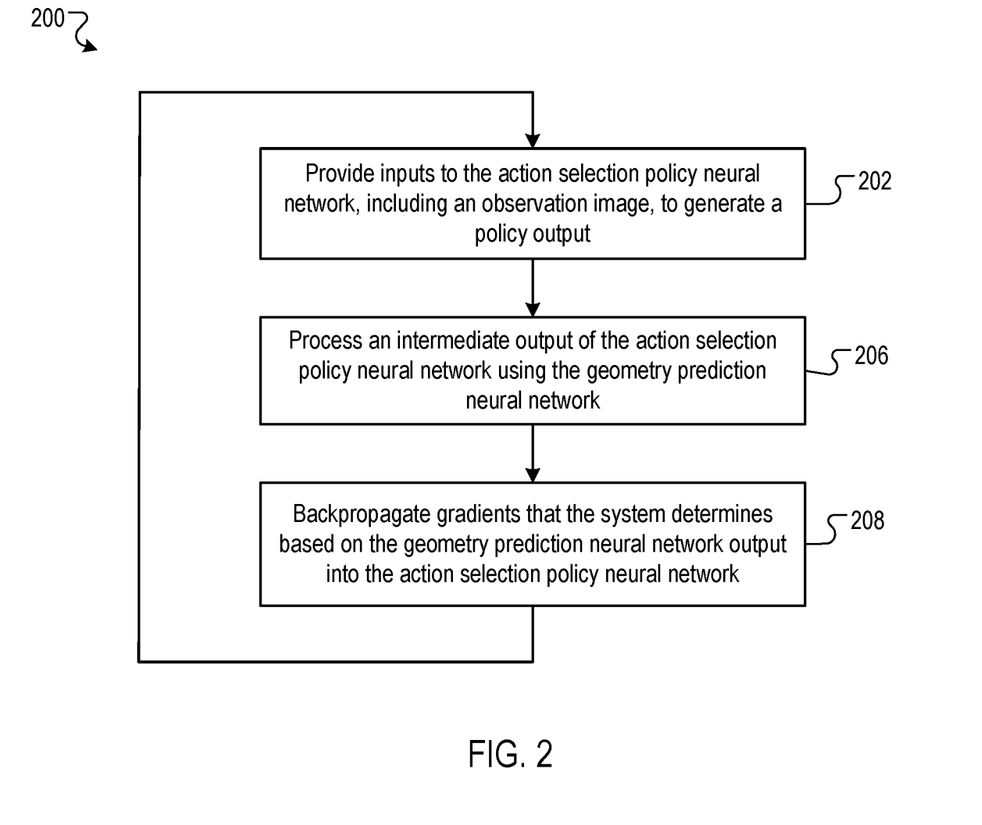
FIG. 2 is a flow diagram of an example process for training the action selection policy neural network by training a geometry prediction neural network.

FIG. 2 is a flow diagram of an example process 200 for training the action selection policy neural network by training a geometry prediction neural network. For convenience, the process 200 will be described as being performed by a training engine including one or more computers located in one or more locations. For example, a training engine, e.g., the training engine 118 of FIG. 1, appropriately programmed in accordance with this specification, can perform the process 200. In general, the training engine performs the process 200 at each of multiple time steps.

The system provides inputs to the action selection policy neural network, including an observation image characterizing a current state of the environment, and the action selection policy neural network processes the inputs in accordance with the values of the set of parameters of the action selection policy neural network to generate a policy output (step 202). In some implementations, the observation image is an RGB image. In some implementations, the inputs provided to the action selection policy neural network may include additional inputs, such as agent-relative lateral and rotational velocity, the action performed by the agent at the previous time step, and the reward received by the system at the previous time step. The agent-relative lateral and rotational velocity and the reward received by the system by the previous time step may be represented as vectors, and the action performed by the agent at the previous time step may be represented specifically by a one-hot encoding vector. In general, the observation image is provided as input to the convolutional encoder neural network of the action selection policy neural network. Depending on the implementation, the additional inputs may be provided as input to the encoder neural network or the intermediate neural network of the action selection policy neural network.

The system provides an intermediate output of the action selection policy neural network as input to the geometry prediction neural network, which processes the input in accordance with the values of the set of parameters of the geometry prediction neural network to generate as output a predicted value of a feature of a geometry of the environment in the current state (step 206).

In some implementations, the intermediate output of the action selection policy neural network provided as input to the geometry prediction neural network is the encoded representation generated by the convolutional encoder neural network of the action selection policy neural network. In some other implementations, the intermediate output of the action selection policy neural network provided as input to the geometry prediction neural network is the intermediate representation generated by the intermediate neural network of the action selection policy neural network. In some other implementations, the system includes two geometry prediction neural networks, where one geometry prediction neural network receives the encoded representation generated by the convolutional encoder neural network of the action selection policy neural network as input, and where the other geometry prediction neural network receives the intermediate representation generated by the intermediate neural network of the action selection policy neural network as input.

In some implementations, the feature of the geometry of the environment in the current state may be the depth of the environment as characterized by the given observation image. In some such implementations, the value of the feature of the geometry of the environment output by the geometry prediction neural network is represented as an array of non-negative scalar values, where each element of the array has a value corresponding to the predicted depth value of a corresponding pixel of the observation image. In some other such implementations, the value of the feature of the geometry of the environment output by the geometry prediction neural network is represented as an array of categorical variables, where each categorical variable represents a range of possible depth values, and each element of the array contains a categorical variable corresponding to the depth of a corresponding pixel of the observation image. In some cases, the categorical variables uniformly sub-divide the range of possible depth values. In some other cases, the categorical variables sub-divide the range of possible depth values more coarsely for lower depth values, and more finely for higher depth values. In some of these implementations, the array has the same dimensionality as the observation image, and in some other implementations the array has a smaller dimensionality than the observation image, for reasons of computational efficiency. In some implementations, the feature of the geometry of the environment in the current state is the distance of the agent from known landmarks in the environment. In some implementations, the feature of the geometry of the environment in the current state is the bearing of the agent relative to known landmarks in the environment. In some implementations, the feature of the geometry of the environment in the current state is the observation image of the environment in the current state, a future observation image of the environment, or a past observation image of the environment. In some implementations, the feature of the geometry of the environment is some combination of the previously described features of the geometry of the environment.

The engine backpropagates the gradient of the geometry-based auxiliary loss to adjust the values of the set of parameters of the geometry prediction neural network and to adjust the values of some of the set of parameters of the action selection policy neural network, in order to minimize the geometry-based auxiliary loss (step 308). In general, the geometry-based auxiliary loss measures a difference between the predicted value of the feature of the geometry generated by the geometry prediction neural network and the actual value of the feature of the geometry. If the predicted value of the feature of the geometry has the form of an array of non-negative scalar values representing predicted depth values for corresponding pixels of the observation, the geometry-based auxiliary loss may be a mean-square error loss between the predicted depth values and the actual depth values. If the predicted value of the feature of the geometry has the form of an array of categorical variables representing predicted depth values for corresponding pixels of the observation, the geometry-based auxiliary loss may be a sum of cross-entropy loss functions for each categorical variable.

Figure 3:
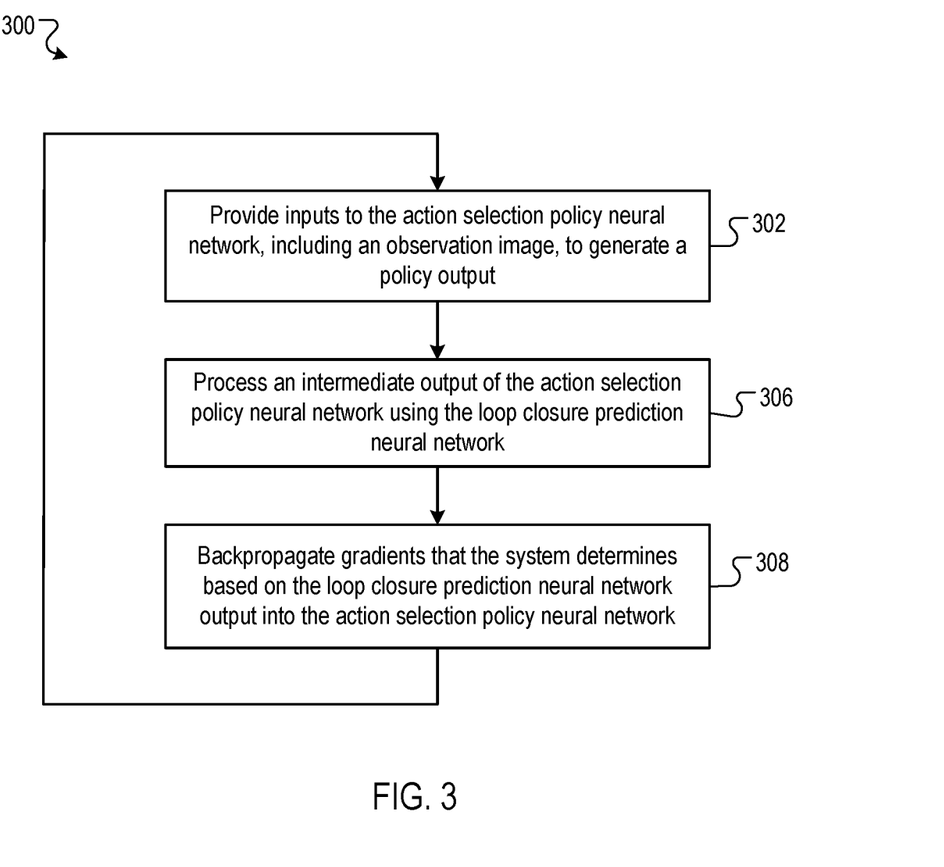
FIG. 3 is a flow diagram of an example process for training the action selection policy neural network by training a loop closure prediction neural network.

FIG. 3 is a flow diagram of an example process 300 for training the action selection policy neural network by training a loop closure prediction neural network. For convenience, the process 300 will be described as being performed by a training engine including one or more computers located in one or more locations. For example, a training engine, e.g., the training engine 118 of FIG. 1, appropriately programmed in accordance with this specification, can perform the process 300. In general, the training engine performs the process 300 at each of multiple time steps.

The system provides inputs to the action selection policy neural network, including an observation image characterizing a current state of the environment, and in some cases one or more additional inputs, and the action selection policy neural network processes the inputs to generate a policy output, similar to step 202 (step 302).

The system provides an intermediate output of the action selection policy neural network as input to the loop closure prediction neural network, which processes the input in accordance with the values of the set of parameters of the loop closure prediction neural network to generate as output a score that represents a predicted likelihood that, when the environment is in the current state, the agent has returned to a location in the environment that the agent has already visited (step 306). In some implementations, the agent is considered to have returned to a location in the environment that the agent has already visited only if the agent previously visited the location within a fixed previous number of time steps.

In some implementations, the intermediate output of the action selection policy neural network provided as input to the loop closure prediction neural network is the encoded representation generated by the convolutional encoder neural network of the action selection policy neural network. In some other implementations, the intermediate output of the action selection policy neural network provided as input to the loop closure prediction neural network is the intermediate representation generated by the intermediate neural network of the action selection policy neural network.

The engine backpropagates the gradient of the loop closure auxiliary loss to adjust the values of the set of parameters of the loop closure prediction neural network and to adjust the values of some of the set of parameters of the action selection policy neural network, in order to minimize the loop closure auxiliary loss (step 308). In general, the loop closure auxiliary loss is based on an actual similarity of the current state to earlier states of the environment and the predicted likelihood that the agent has returned to a location in the environment that the agent has already visited generated by the loop closure prediction neural network. Additionally or alternatively however a measure of similarity of location may be obtained by integrating the agent-relative lateral velocity to determine whether the agent has returned to a similar location to one previously visited. In some implementations, the loop closure auxiliary loss is a Bernoulli loss between the predicted likelihood generated by the loop closure prediction neural network and a binary label. In these implementations, the binary label has value 1 if the location of the agent at the current time step is within a first threshold distance of the location of the agent at a particular previous time step and if the location of the agent deviated from the current location of the agent at any time step between the particular time step and the current time step by at least a second threshold distance, and has value 0 otherwise. The value of the binary label depends on the second threshold in order to avoid assigning label value 1 to trivial loop closures between consecutive time steps. Thus in some implementations the loop closure prediction includes a condition that the agent passes through a location greater than the second threshold distance away from a location before returning to the location.

In some implementations gradients from the loop closure loss may be combined in a weighted sum with gradients from the geometry prediction when training the system. The weights may be hyperparameters of the system.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method of training an action selection neural network having a plurality of network parameters for use in selecting actions to be performed by an agent navigating through an environment to accomplish one or more goals, the method comprising:
   receiving an observation characterizing a current state of the environment;
   processing, using the action selection neural network and in accordance with current values of the network parameters, an input comprising the observation to generate an action selection output for use in controlling the agent to perform the actions;
   processing, using a loop closure prediction neural network, an intermediate output generated by the action selection neural network to predict a value of a loop closure feature that characterizes whether, when the environment is in the current state, the agent has returned to a location in the environment that the agent has already visited;

determining an actual value of the loop closure feature; and determining a loop closure-based auxiliary update for the current values of the network parameters of the action selection neural network based on an error between the prediction of the value of the loop closure feature and the actual value of the loop closure feature, comprising:

determining a gradient of a loop closure-based auxiliary loss that is based on the error between the prediction of the value of the loop closure feature and the actual value of the loop closure feature; and backpropagating the gradient of the loop closure-based auxiliary loss into the action selection neural network to determine the loop closure-based auxiliary update for the current values of the network parameters.

2. The method of claim 1, wherein determining the actual value of the loop closure feature comprises:

determining whether a current location of the agent in the environment at a current time step is within a first threshold distance of a particular previous location of the agent in the environment at a particular previous time step; and determining whether a location of the agent in the environment deviated from the current location of the agent at a time step between the particular previous time step and the current time step by at least a second threshold distance.

3. The method of claim 1, wherein the action selection neural network comprises:

a convolutional encoder neural network that generates an encoded representation of the input, an intermediate neural network that processes the encoded representation of the input to generate an intermediate representation, and an output neural network that processes the intermediate representation to generate the action selection output.

4. The method of claim 3, wherein the intermediate output comprises the encoded representation.

5. The method of claim 3, wherein the intermediate output comprises the intermediate representation.

6. The method of claim 3, wherein the intermediate neural network comprises a recurrent neural network.

7. The method of claim 3, wherein the intermediate neural network comprises a feedforward neural network.

8. The method of claim 1, further comprising:

selecting an action to be performed by the agent when the environment is in the current state using the action selection output;

receiving a reward that is based on progress toward accomplishing the one or more goals; and determining a main update for the current values of the network parameters of the action selection neural network based at least in part on the reward.

9. The method of claim 8, further comprising:

using the loop closure-based auxiliary update and the main update to update the current values of the network parameters of the action selection neural network.

10. The method of claim 1, further comprising:

updating the current values of the network parameters of the action selection neural network using the loop closure-based auxiliary update to generate updated parameter values; and using the action selection neural network to select an action to be performed by the agent in accordance with the updated parameter values.

11. A system comprising:

one or more computers; and one or more storage devices communicatively coupled to the one or more computers, wherein the one or more storage devices store instructions that, when executed by the one or more computers, cause the one or more computers to perform operations for training an action selection neural network having a plurality of network parameters for use in selecting actions to be performed by an agent navigating through an environment to accomplish one or more goals, the operations comprising:

receiving an observation characterizing a current state of the environment;

processing, using the action selection neural network and in accordance with current values of the network parameters, an input comprising the observation to generate an action selection output for use in controlling the agent to perform the actions;

processing, using a loop closure prediction neural network, an intermediate output generated by the action selection neural network to predict a value of a loop closure feature that characterizes whether, when the environment is in the current state, the agent has returned to a location in the environment that the agent has already visited;

determining an actual value of the loop closure feature; and determining a loop closure-based auxiliary update for the current values of the network parameters of the action selection neural network based on an error between the prediction of the value of the loop closure feature and the actual value of the loop closure feature, comprising:

determining a gradient of a loop closure-based auxiliary loss that is based on the error between the prediction of the value of the loop closure feature and the actual value of the loop closure feature; and backpropagating the gradient of the loop closure-based auxiliary loss into the action selection neural network to determine the loop closure-based auxiliary update for the current values of the network parameters.

12. The system of claim 11, wherein determining the actual value of the loop closure feature comprises:

determining whether a current location of the agent in the environment at a current time step is within a first threshold distance of a particular previous location of the agent in the environment at a particular previous time step; and determining whether a location of the agent in the environment deviated from the current location of the agent at a time step between the particular previous time step and the current time step by at least a second threshold distance.

13. The system of claim 11, wherein the action selection neural network comprises:

a convolutional encoder neural network that generates an encoded representation of the input, an intermediate neural network that processes the encoded representation of the input to generate an intermediate representation, and an output neural network that processes the intermediate representation to generate the action selection output.

14. The system of claim 13, wherein the intermediate output comprises the encoded representation.

15. The system of claim 13, wherein the intermediate output comprises the intermediate representation.

16. The system of claim 13, wherein the intermediate neural network comprises a recurrent neural network.

17. One or more non-transitory computer storage media storing instructions that when executed by one or more computers cause the one or more computers to perform operations for training an action selection neural network having a plurality of network parameters for use in selecting actions to be performed by an agent navigating through an environment to accomplish one or more goals, the operations comprising:

receiving an observation characterizing a current state of the environment;

processing, using the action selection neural network and in accordance with current values of the network parameters, an input comprising the observation to generate an action selection output for use in controlling the agent to perform the actions;

processing, using a loop closure prediction neural network, an intermediate output generated by the action selection neural network to predict a value of a loop closure feature that characterizes whether, when the environment is in the current state, the agent has returned to a location in the environment that the agent has already visited;

determining an actual value of the loop closure feature; and determining a loop closure-based auxiliary update for the current values of the network parameters of the action selection neural network based on an error between the prediction of the value of the loop closure feature and the actual value of the loop closure feature, comprising:

determining a gradient of a loop closure-based auxiliary loss that is based on the error between the prediction of the value of the loop closure feature and the actual value of the loop closure feature; and backpropagating the gradient of the loop closure-based auxiliary loss into the action selection neural network to determine the loop closure-based auxiliary update for the current values of the network parameters.

18. The non-transitory computer storage media of claim 17, wherein determining the actual value of the loop closure feature comprises:

determining whether a current location of the agent in the environment at a current time step is within a first threshold distance of a particular previous location of the agent in the environment at a particular previous time step; and determining whether a location of the agent in the environment deviated from the current location of the agent at a time step between the particular previous time step and the current time step by at least a second threshold distance.

19. The non-transitory computer storage media of claim 17, wherein the action selection neural network comprises:

a convolutional encoder neural network that generates an encoded representation of the input, an intermediate neural network that processes the encoded representation of the input to generate an intermediate representation, and an output neural network that processes the intermediate representation to generate the action selection output.

20. The non-transitory computer storage media of claim 19, wherein the intermediate output comprises the encoded representation.

* * * * *